April 18, 1967  T. W. HOGAN  3,314,689
END SHIFTABLE TRAILER WHEEL ASSEMBLY
Filed March 4, 1965
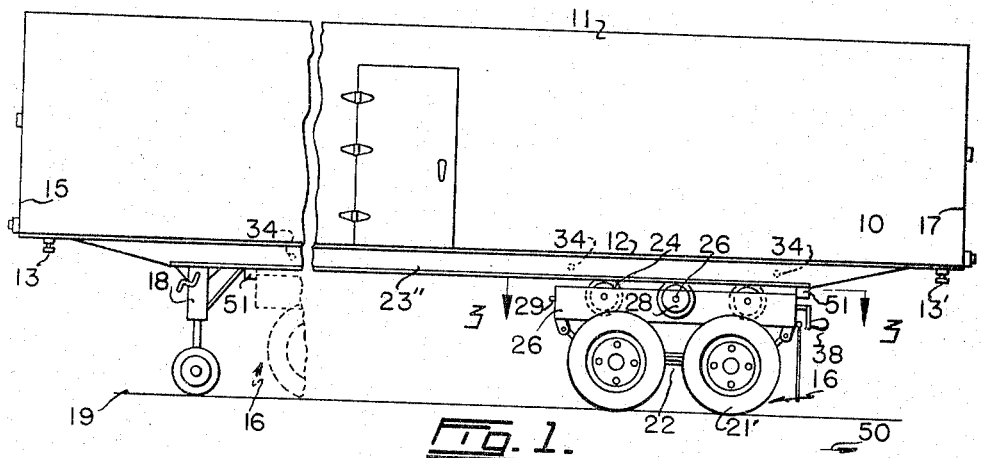
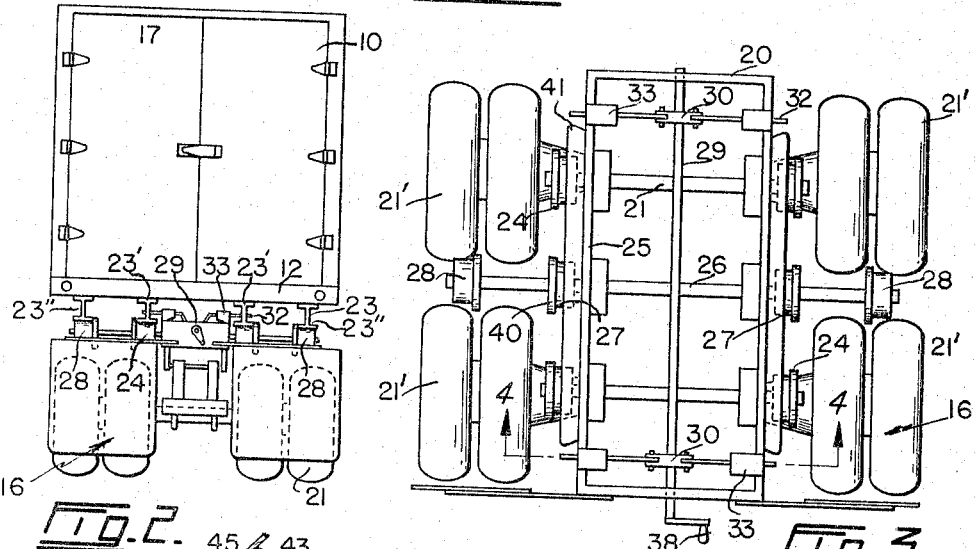
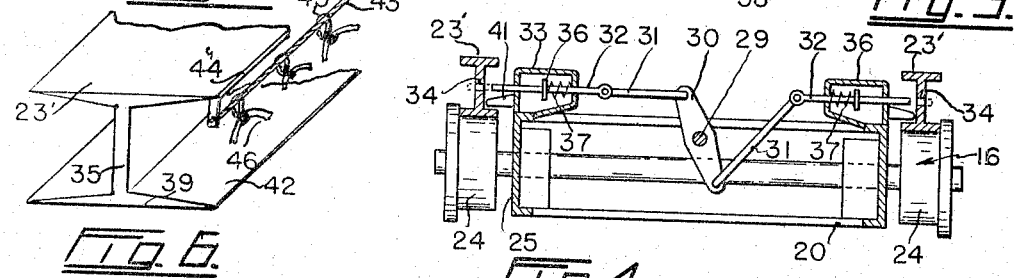
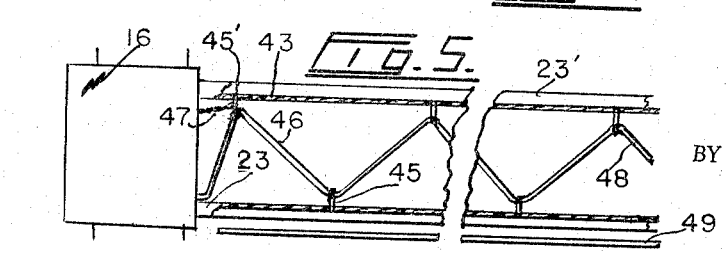
INVENTOR.
TERRENCE W. HOGAN
BY
HIS ATT'YS

United States Patent Office 3,314,689
Patented Apr. 18, 1967

3,314,689
END SHIFTABLE TRAILER WHEEL ASSEMBLY
Terrence W. Hogan, 14—1721 Moodie St.,
Fort William, Ontario, Canada
Filed Mar. 4, 1965, Ser. No. 437,016
1 Claim. (Cl. 280—81)

My invention relates to new and useful improvements in wheel truck assemblies for trailer vans and the like.

So-called semi-trailers consist of a trailer van pulled by a detachable cab unit.

Such vans are normally backed up to a loading or unloading platform but due to the size of the vans, considerable time is spent in loading or unloading.

Also, due to the length of conventional trailer vans, it is difficult to utilize loading or unloading machinery to its fullest extent so that it is conventional to attempt to load by the rear door than sometimes by the side doors of the van.

My invention overcomes these disadvantages by providing a wheel truck assembly which normally is situated at the rear of the van but which can be moved to the opposite end of the van when desired.

This means that the van be partially unloaded from one end, the wheel truck assembly moved to the other end and the van backed to the loading ramp so that loading or unloading can proceed from the opposite end.

This means that loading or unloading machinery can be utilized to a greater extent and provides faster turn around for trailer vans.

The principal object and essence of the invention is therefore to provide a device of the character herewithin described in which the wheel truck assembly can be positioned at one end or the other of the van as desired.

Another object of the invention is to provide a device of the character herewithin described in which the wheel truck assembly is normally locked into position.

A still further object of the invention is to provide a device of the character herewithin described which can be installed on conventional vans or, alternatively, can be included as initial equipment.

Still another object of the invention is to provide a device of the character herewithin described which is simple in construction, economical in manufacture, and otherwise well suited to the purpose for which it is designed.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which:

FIGURE 1 is a side elevation of a trailer van with my invention in the normal road using position.

FIGURE 2 is a rear view of FIGURE 1.

FIGURE 3 is a top plan view of the wheel truck assembly substantially along the lines 3—3 of FIGURE 1.

FIGURE 4 is a sectional view along the line 4—4 of FIGURE 3.

FIGURE 5 is a schematic plan view of the wheel truck assembly and the tracks showing the air hose connections.

FIGURE 6 is an enlarged fragmentary isometric view showing the method of mounting the hose carrying wire.

In the drawings like characters of reference indicate corresponding parts in the different figures.

Proceeding therefore to describe my invention in detail, reference should first be made to FIGURE 1 in which is shown a conventional trailer van 10 comprising a body 11 mounted upon a chassis 12 and normally connected to a conventional cab drive unit (not illustrated) by means of the connection 13 situated at the forward end 15 of the trailer.

The wheel truck assembly collectively designated 16 is normally situated adjacent the rear end 17 of the van unit when the device is being driven upon the roads. When the cab unit is disconnected from the trailer van, the conventional landing gear assembly 18 is lowered to engage the road surface 19 as shown in FIGURE 1 thus stabilizing the trailer van when not moving.

The wheel truck assembly 16 is normally permanently secured to the chassis 12 but my device is mounted so that it can be moved from one end to the other of the chassis.

The wheel truck assembly comprises a substantially rectangular frame 20 carrying axles transversely thereof upon the ends of which are mounted pairs of ground engaging wheels 21', said axles being mounted to the frame by means of road springs 22.

Situated upon the underside of the chassis 12 of the trailer van are pairs of I-beam tracks 23, said tracks being in spaced and parallel relationship and running longitudinally of the chassis as shown.

Flanged bearing wheels 24 are journalled for rotation outside the side members 25 of the frame 20 and adjacent the underside thereof by axles 21 extending through the side members, there being two pairs of flanged bearing wheels, one adjacent the front of the frame and the other adjacent the rear of the frame.

These bearing wheels engage the undersides of the inner I-beams 23' thus mounting the van upon the wheel truck assembly.

Between the front and rear pairs of bearing wheels I have provided a central set of bearing wheels mounted upon a transverse axle 26, said axle mounting a pair of inner wheels 27 which also engage the inner I-beams 23' and a pair of outboard bearing wheels 28 which engage the outer I-beams specifically designated 23" thus providing stability for the assembly.

It is, of course, necessary to be able to lock the wheel truck assembly either in the position shown in full line in FIGURE 1 or the alternative position shown partially in phantom in FIGURE 1 and in this connection reference should be made specifically to FIGURE 4.

A shaft 29 is situated within the frame 20 and substantially upon the longitudinal axis thereof.

Front and rear levers 30 are secured to the shaft and linkage 31 extends from each end of the levers 30 to pins 32 situated transversely and mounted for extension and retraction within bearing boxes 33 situated upon the underside of the frame 20.

These pins, when extended fully, are adapted to engage within locking apertures 34 formed through the webs 35 of the I-beams.

The pins 32 are provided with washers 36 secured to the pins within the bearing boxes 33, and springs 37 react between the boxes and washers thus normally maintaining the pins in the extended or locked position.

A handle 38 is secured to one end of the shaft 29 thus permitting the shaft to be rotated to withdraw the pins from the locking apertures when it is desired to move the wheel truck assembly.

The aforementioned I-beams 23 include a lower horizontal flange 39 which engage the aforementioned roller wheels 24 and 28 and the flanges 40 of these wheels prevent sideways movement of the wheel truck assembly relative to the van chassis 12.

It is also desirable to prevent upward displacement of the van assembly from the wheel truck assembly in the event that the locking pins inadvertently become displaced in this connection, I provide locking flanges 41 extending upon either side of the frame 20 of the wheel truck assembly, said locking flanges engaging upon the upper side 42 of the horizontal flange 39 as clearly shown in FIGURES 3 and 4.

Due to the fact that the wheel truck assembly can be moved from one end to the other of the van unit, it is necessary to provide means whereby the air brake hose may be utilized irrespective of the position of the assembly and in this connection reference should be made to FIGURES 5 and 6.

I provide a wire cable 43 extending along a pair of inner I-beams 23' and depending from the upper flange 44 thereof.

A plurality of rings 45 slide freely on these cables and the air hose 46 is taped to these rings in a zigzag fashion between the I-beams as clearly shown schematically in FIGURE 5.

A check chain 47 extends from the wheel truck assembly to the first ring specifically designated 45' and one end 48 of the air hose is connected to an air carrying conduit 49 situated adjacent one of the I-beams and running from one end of the chassis to the other.

When the wheel truck assembly is in the position shown in FIGURE 1 in full line, the air hose is concertinaed in a closed position but when the truck assembly is moved to the position shown in phantom in FIGURE 1, the air hose extends as shown schematically in FIGURE 5.

In operation, the van of course, can be backed up to a loading ramp by means of the truck connected to the connections 13, this operation being conventional.

However, when it is desired to reverse the van to unload from the end 15, the landing wheel assembly 18 is lowered until it engages the ground and the air brakes (not illustrated) are applied to the ground engaging wheels 21 of the wheel truck assembly.

The cab unit is then unhitched from the connection 13 and connected to the end 17 of the van unit by a similar connection 13' situated at this end. The rod 29 is rotated by handle 38 thus withdrawing the locking pins 32 from the apertures 34, whereupon the cab unit moves the van in the direction of arrow 50 (FIG. 1), the wheel truck assembly remaining stationary due to the fact that the air brakes are in the "on" position.

When the van unit has been moved so that the wheel track assembly is adjacent the landing wheel assembly 18, the locking pins 32 are released to engage corresponding apertures 34 thus locking the wheel track unit in this position. The landing assembly 18 is then raised and the van unit can be backed up to the loading or unloading dock by the end 15 after the air brakes are released from the wheels 21.

When it is desired to reverse the position of the wheel truck assembly, a similar procedure is followed.

It will be appreciated that it is necessary to provide positive stop means for the wheel truck unit and in this connection I provide stops 51 at either end of the I-beams engageable by the frame 20 of the wheel truck assembly and when the wheel truck assembly is adjacent either of the stops 51, the locking pins 32 register with the corresponding apertures 34.

Since various modifications can be made in my invention as hereinabove described, and many apparently widely different embodiments of same made within the spirit and scope of the claim without departing from such spirit and scope, it is intended that all matter contained in the accompanying specification shall be interpreted as illustrative only and not in a limiting sense.

What I claim as my invention is:

In a trailer adapted to be towed selectively from opposite ends in opposite directions, the combination of an elongated chassis provided at the underside thereof with inner and outer pairs of transversely spaced parallel rails extending substantially the fulll ength of the chassis, said rails being channel-shaped and having lower horizontal flanges, a wheel truck assembly disposed under said chassis and including a substantially rectangular frame, a pair of end cross shafts and an intermediate cross shaft mounted in said frame, pairs of flanged inner rollers provided on said end and intermediate cross shafts and rollingly engaging lower surfaces of said flanges of the inner rails, a pair of flanged outer rollers provided on said intermediate cross shaft in laterally outwardly spaced relation from the inner rollers and rollingly engaging lower surfaces of said flanges of the outer rails, said inner and outer rollers permitting said chassis to be moved over said wheel truck assembly from one end of the chassis to the other while the wheel truck assembly remains relatively stationary, means provided on said wheel truck assembly frame and engageable with the inner rails for releasably locking the wheel truck assembly selectively at the opposite ends of said chassis to prevent longitudinal movement of the chassis relative to the wheel truck assembly, a pair of keeper flanges projecting laterally outwardly from opposite sides of said frame and overlying upper surfaces of said flanges of the inner rails whereby to prevent the chassis from lifting off said rollers of the wheel truck assembly, and an air brake hose connection for said wheel truck assembly, said connection comprising a pair of cables disposed in parallel to said inner rails, a plurality of rings freely slidable on said cables, and a flexible hose connected at one end thereof to the wheel truck assembly and at its other end to an air supply on the chassis, the intermediate portion of said flexible hose being secured in zigzag formation to said rings whereby the hose may be extended and contracted longitudinally of the chassis during relative movement of the wheel truck assembly from one end of the chassis to the other.

References Cited by the Examiner
UNITED STATES PATENTS

| | | | |
|---|---|---|---|
| 2,010,969 | 8/1935 | Soulis | 280—80 |
| 2,812,088 | 11/1957 | Cadillac et al. | |
| 3,004,772 | 10/1961 | Bohlen et al. | 280—415 |
| 3,048,421 | 7/1962 | Matlock | 280—81 |
| 3,085,816 | 4/1963 | Tantlinger et al. | 280—80 |
| 3,146,000 | 8/1964 | Holzman | 280—405 X |

KENNETH H. BETTS, *Primary Examiner.*